United States Patent [19]

Schei

[11] 4,072,998
[45] Feb. 7, 1978

[54] OVER-VOLTAGE PROTECTION DEVICE

[75] Inventor: Asle Schei, Trondheim, Norway

[73] Assignee: ASEA Aktiebolag, Vasteras, Sweden

[21] Appl. No.: 659,507

[22] Filed: Feb. 19, 1976

[30] Foreign Application Priority Data

Mar. 18, 1975 Sweden .............................. 7503020

[51] Int. Cl.² ............................................. H02H 3/22
[52] U.S. Cl. .................................... 361/117; 361/128
[58] Field of Search ...................... 317/61, 31, 67, 68, 317/69, 70, 73, 74; 315/36; 361/117, 126–128

[56] References Cited

U.S. PATENT DOCUMENTS

| 2,608,600 | 8/1952 | Vorts et al. ...................... 317/61 X |
| 3,094,648 | 6/1963 | Nilsson ................................ 317/61 |
| 3,566,197 | 2/1971 | Nilsson et al. .................... 317/69 X |
| 3,657,594 | 4/1972 | Latal ................................. 317/70 X |

Primary Examiner—J D Miller
Assistant Examiner—Patrick R. Salce

Attorney, Agent, or Firm—Watson, Cole, Grindle & Watson

[57] ABSTRACT

In an over-voltage protection device which includes a plurality of stacks of series-connected, substantially identical surge arrester sections, each comprising an insulated casing containing a voltage-dependent resistor with a spark gap assembly, which sections are mutually electrically connected at their upper and lower ends, there is provided a triggering circuit in parallel with the arrester stacks which includes a plurality of series-connected control spark gaps corresponding to the number of arrester sections in each arrester stack and a triggering resistor connected in series with the control spark gaps. Cross-connections containing triggering impedances extend from a connection point between two control spark gaps to the corresponding connection point between two arrester sections of each of the parallel stacks. Control impedances are connected in parallel with the spark gap. The triggering impedances are constituted by resistors.

5 Claims, 1 Drawing Figure

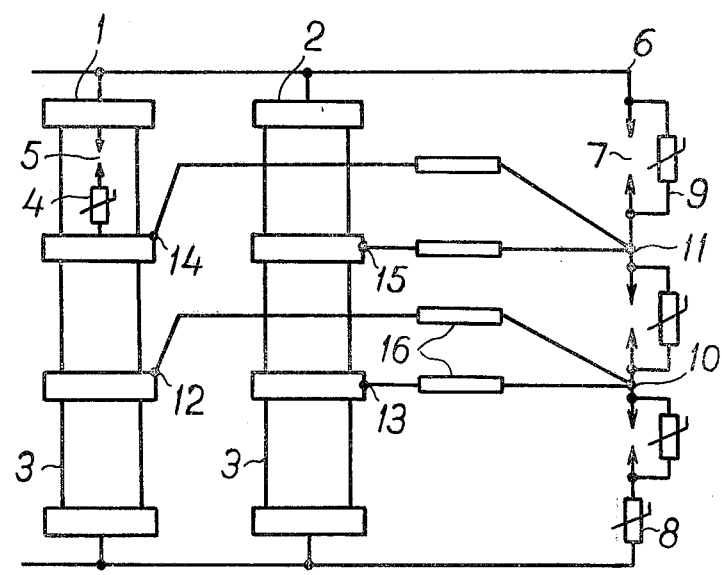

OVER-VOLTAGE PROTECTION DEVICE

BACKGROUND OF THE INVENTION

1. Field of the Invention

The present invention relates to an over-voltage protection device of the type which includes a plurality of stacks of series-connected, substantially identical surge arrester sections mutually electrically connected at their upper and lower ends. Each arrester section comprises an insulating casing containing a voltage-dependent resistor series-connected with a spark gap assembly. In such devices it is extremely important that the parallel-connected arrester stacks can be triggered into sharing the discharging current and the discharging energy in parallel.

2. The Prior Art

Devices for triggering parallel legs of valve resistors and spark gaps built into one and the same porcelain housing are previously known (see, U.S. Pat. No. 3,566,197). Such devices are used when a higher energy-absorbing capacity is needed than can be taken by one single leg. These known solutions are particularly used with arresters and breaking devices for high-voltage direct current, but also for alternating-current arresters for extra high voltages. In certain cases, however, there are needed more legs than can be accommodated within a given porcelain housing, and it is therefore desirable to be able to parallel-connect also a number of separate porcelain housings. Today this is of interest principally in breaker devices for high-voltage direct current (for example of the type shown in U.S. Pat. No. 3,809,959) and in devices in connection with series capacitors for achieving and maintaining an uninterrupted stabilization of the operating condition in high-voltage power supply networks (see Fahlen application, Ser. No. 536,227, filed Dec. 24, 1974, which is a streamlined continuation of Ser. No. 418,110, filed Nov. 21, 1973). It was previously known to parallel-connect several separately arranged stacks of arrester sections U.S. Pat. No. 2,608,600), but the triggering system which is used there presupposes that the different arrester sections in a stack have different resistance values. From a practical and economical point of view, however, this is a disadvantage, and therefore solutions where the arrester stacks can be modulized are aimed at, that is where stacks can be built up of sections (modules) which are mainly exactly alike.

SUMMARY OF THE INVENTION

The purpose of the invention is to achieve a simple and reliable triggering system in a surge arrester of the embodiment stated in the preamble. This is achieved by providing a triggering circuit which includes a plurality of series-connected control spark gaps, corresponding to the number of arrester sections in each arrester stack, and a triggering resistor connected in series with a control spark gap. Cross-connections containing triggering impedances are provided from a connection point between two control spark gaps to a corresponding connection point between two arrester sections of each of the parallel arrester stacks. Control impedances are connected in parallel with the spark gaps. The triggering impedances may be constituted by resistors. A plurality of arrester stacks are positioned concentrically around a centrally arranged triggering arrester and the cross-connections extend radially outwardly in different horizontal planes.

The advantage of this system is that parallel arrester units can work in parallel and share the energy between them. Furthermore, the ignition voltage of the parallel-connection is determined by the triggering circuit. The ignition voltage of the parallel arrester stacks can thus be chosen considerably higher than the ignition voltage of the complete arrangement. In this way a higher recurring strength, a higher extinction voltage and simultaneously a more stable ignition are obtained. The triggering circuit which determines the ignition voltage is not stressed by the large discharging currents.

BRIEF DESCRIPTION OF THE DRAWINGS

The accompanying FIGURE shows schematically an embodiment of a surge arrester according to the invention.

DESCRIPTION OF THE PREFERRED EMBODIMENTS

The shown surge arrester comprises two parallel-connected arrester stacks 1 and 2, each of which consists of three series-connected, identical surge arrester sections 3. Each such arrester section consists of a voltage-dependent resistor 4 connected in series with a spark gap assembly 5. Parallel to the parallel arrester stacks 1, 2, there is connected a triggering circuit 6 comprising three series-connected control spark gaps 7 and a triggering resistor 8 in series with the control spark gaps. To achieve an even distribution of the voltage across the control spark gaps, control resistors 9 and possibly also capacitors are arranged in parallel with each control spark gap. The control resistors 9 as well as the triggering resistor 8 may suitably consist of voltage-dependent, so-called surge arrester blocks.

The spark gaps 7 and triggering resistor 8 of the triggering circuit are constructed in four parts which are stacked on top of each other so that a separate column is formed, which is referred to below as the triggering arrester. Each of the three upper parts of the triggering arrester contains one of the resistance- and possibly capacitance-controlled spark gaps 7, each of which may be series-connected with surge arrester blocks, whereas the lower part only contains the triggering resistor 8.

From connection points 10, 11 between two control spark gaps 7 to corresponding connection points 12, 13 and 14, 15, respectively, between two arrester elements 3 of each of the parallel arrester stacks 1 and 2, there are connected triggering impedances 16 which may suitably consist of arrester blocks enclosed in separate procelain housings.

The surge arrester device shown operates in the following manner:

When the arrester device is subjected to an overvoltage, the triggering arrester 6 always ignites first since the ignition voltage of this arrester is lower than that of the arrester stacks 1, 2. At the moment of ignition of the triggering arrester, the voltage across the lowermost sections 3 of the arrester stacks is considerably increased, so that said sections spark over. The voltage is then applied substantially across the lowermost triggering impedances 16, and the voltage is increased considerably across the central arrester sections, and the whole process continues in this way until all arrester sections have ignited.

The triggering arrester can be chosen to be so high-ohmic compared with the parallel arrester stacks that it may burn during the whole discharging process without being damaged. By dimensioning the components included in a suitable manner, however, it can also be made to become extinguished when the triggering has been performed.

Both the spark gaps 5 of the arrester sections and the control spark gaps 7 may be in the form of self-extinguishing spark gaps with magnetic blowout coils.

The number of parallel arrester stacks is determined by the desired energy-absorbing capacity and may, in principle, be of any size. The same is true of the number of series-connected arrester sections in each stack, which is determined by the desired extinction voltage.

Surge arrester devices of the embodiment described are suitably arranged with the triggering column in the middle and the different arrester stacks erected rotary-symmetrically around said column, the triggering impedances 16 being arranged radially between the triggering column and the different arrester stacks.

I claim:

1. Over-voltage protection device comprising a plurality of stacks (1, 2) of series-connected, identical surge arrester sections (3), mutually electrically connected at their upper and lower ends, in which each arrester section (3) comprises an insulating casing containing a voltage-dependent resistor (4) series-connected with a spark gap assembly (5), and a triggering circuit (7, 8, 16) in parallel with the arrester stacks (1, 2), said triggering circuit comprising a plurality of series-connected control spark gaps (7), corresponding to the number of arrester sections (3) in each arrester stack (1, 2), and a triggering resistor (8) connected in series with the control sparks gaps, and cross-sections containing triggering impedances (16) from a connection point (10, 11) between two control spark gaps (7) only to a corresponding connection point (12, 13 and 14, 15, respectively) between two arrester sections (3) of each of the parallel arrester stacks (1, 2), said triggering circuit having a higher resistance and a lower ignition voltage than said arrester stacks.

2. A device according to claim 1, in which control impedances (9) are connected in parallel with the control spark gaps (7).

3. A device according to claim 1, in which the triggering impedances (16) comprise resistors.

4. A device according to claim 1, in which the control spark gaps (7) and the series-connected triggering resistor (8) form a separate column which constitutes a triggering arrester (6).

5. A device according to claim 4, in which the arrester stacks (1, 2) are positioned concentrically around a centrally arranged triggering arrester (6), and in which said cross-connections extend radially outwardly in at least one horizontal plane.

* * * * *